United States Patent [19]

Lapp et al.

[11] Patent Number: 5,052,793
[45] Date of Patent: Oct. 1, 1991

[54] GLASS TO METAL ATTACHMENT DEVICE AND METHOD THEREFOR

[75] Inventors: Roger H. Lapp, Silver Spring; Robert R. Gardner, Glen Burnie, both of Md.

[73] Assignee: The Johns Hopkins University, Baltimore, Md.

[21] Appl. No.: 308,867

[22] Filed: Feb. 10, 1989

[51] Int. Cl.⁵ .......................... G02B 7/00; B25B 1/00
[52] U.S. Cl. ............................... 359/848; 248/231.7; 248/316.1; 248/488; 269/224; 269/249; 24/523; 24/525; 359/849; 359/871; 359/896; 359/900
[58] Field of Search .............. 350/251, 252, 631, 320, 350/321, 607, 609, 611; 248/231.7, 316.1, 488, 231.1, 225.31; 29/257; 24/458, 486, 514, 522, 523, 525, 569; 269/224, 249

[56] References Cited

U.S. PATENT DOCUMENTS

| | | | |
|---|---|---|---|
| 359,833 | 3/1887 | Basinger | 248/231.7 |
| 610,620 | 9/1898 | Bassford, Jr. | 24/523 |
| 1,047,284 | 12/1912 | Pfustler | 24/523 |
| 2,665,598 | 1/1954 | Hardy | 269/224 |
| 2,805,877 | 9/1957 | Ashley | 24/523 |
| 2,867,003 | 1/1959 | Stiles | 269/224 |
| 2,905,054 | 9/1959 | Logan | 350/251 |
| 3,040,433 | 6/1962 | Heinzel | 248/316.1 |
| 3,535,508 | 10/1970 | Warshauser | 248/231.7 |
| 4,408,832 | 10/1983 | Hartman et al. | 350/607 |
| 4,448,000 | 5/1984 | Manuccia et al. | 350/589 |
| 4,708,183 | 11/1987 | Figueroa | 248/316.1 |

FOREIGN PATENT DOCUMENTS

| | | | |
|---|---|---|---|
| 0070207 | 4/1983 | Japan | 350/609 |
| 0255907 | 11/1987 | Japan | 350/251 |
| 2101032 | 1/1983 | United Kingdom | 29/257 |

OTHER PUBLICATIONS

Ulrich, "Mirror Mount" IBM Technical Disclosure Bulletin; vol. 18; No. 7, Dec. 1975.
Adams et al.; "Adjustable Mirror Mount"; IBM Technical Disclosure Bulletin; vol. 18, No. 9; Feb. 1976.

Primary Examiner—Bruce Y. Arnold
Assistant Examiner—R. D. Shafer
Attorney, Agent, or Firm—Robert E. Archibald; Francis A. Cooch

[57] ABSTRACT

The invention is directed to a device for rapidly attaching glass to a metal support structure without cracking the glass. The invention consists of a C clamp with a force providing screw threadably engaged through a hole in one leg of the C clamp. The force providing screw has a spindle on one end which rides in a channel in the metal support structure. A spring, Belleville washer or other energy storing device is mounted on the spindle and is compressed against the metal support structure by the spindle base when the force providing screw is tightened. The amount of force that can be applied is limited by the combination of the screw head on the force providing screw and the longer length of the channel in relation to the spindle.

20 Claims, 2 Drawing Sheets

GLASS TO METAL ATTACHMENT DEVICE AND METHOD THEREFOR

STATEMENT OF GOVERNMENTAL INTEREST

The Government has rights in this invention pursuant to Contract No. N00039-87-C-5301 awarded by the Department of the Navy.

BACKGROUND OF THE INVENTION

The invention relates to a device for attaching glass to metal and, more specifically, to attaching or mounting a lens or mirror to or on a metal support structure.

Glass or ceramic mirrors, optical lens and the like frequently need to be attached to or mounted on metal support structures for use in telescopes, reflecting mirrors, radars, cameras, etc. The assembled device may then be placed in a vacuum chamber in order to coat the mirror and thereafter be subject to vibration and temperature extremes during transport and use. Any device and method for attaching glass to a metal support structure must be able to meet the demands of these environments while simultaneously facilitating rapid assembly and disassembly.

The invention described and claimed herein, unlike the prior art solutions, satisfies the environmental and ease of assembly/disassembly requirements just discussed. Certainly, none of the prior art is structurally similar to the claimed invention. See, e.g., U.S. Pat. Nos. 2,817,998; 4,023,891; 4,629,297; 4,632,523; and 4,657,361.

The most commonly used method of attaching glass to metal involves the use of adhesives, i.e., glue, which works best only within certain temperature ranges. If glue is used and the glass-to-metal assembly is then placed in an environment outside of the specified temperature ranges, the glass may crack due to the differential thermal expansion between the glass and metal or the glue may simply fail unexpectedly with disastrous results when the mirror falls off its support. Still further, if, as is normally the case after mounting, the assembled device is placed in a vacuum chamber in order to coat the glass the glue will outgas contaminating the chamber and weakening the bond between glass and metal.

Mechanical solutions to attaching glass-to-metal also have disadvantages. The chief problem is the chipping, cracking or breaking of the glass that can occur when excessive force is applied to the glass through the mechanical attachment means.

Whether the attachment or mounting means is adhesive or mechanical, the assembly process, using prior art devices, substances and methods, is time consuming and labor intensive and, hence, expensive.

SUMMARY OF THE INVENTION

The problems described above are solved, to a great extent, through the practice of the invention. Illustratively, a C clamp and a force providing screw threaded through one leg of the clamp are the basic components holding the glass to the metal. In addition, however, a spindle and screw head are added to opposite ends of the force providing screw, one or more Belleville washers are mounted on the spindle, and a channel is added to the metal support structure to receive the spindle. These latter components limit the amount of force that can be applied to the glass and metal support structure assembly and thereby prevent cracking or breaking of the glass.

In operation, the force providing screw is tightened until the screw head is flush with the leg of the C clamp driving the spindle into the channel in the metal support structure and compressing the Belleville washers on the spindle against the support structure. When the screw head is flush against the leg of the C clamp, the spindle is of such a length that it does not bottom out in the channel. Thus, the present invention overcomes the disadvantages of the prior art by its ability to maintain a controlled force on the mirror assembly and, simultaneously, to limit the total amount of force that can be applied to the assembly. Of course, the problems of using adhesives such as glue are avoided altogether with the invention maintaining its effectiveness over a worldwide range of temperatures as well as in situations involving vibration or in vacuum chambers. Assembly/disassembly using the invention is extremely rapid permitting, in an actual case, three people to mount a six-foot mirror in one hour instead of the several days it would otherwise have taken using glue.

For a more complete appreciation of the invention, attention is invited to the following detailed description of a preferred embodiment of the invention taken with the figures of the drawing. The scope of the invention, however, is limited only through the claims appended hereto.

DETAILED DESCRIPTION OF THE PREFERRED EMBODIMENT

Figure 1:
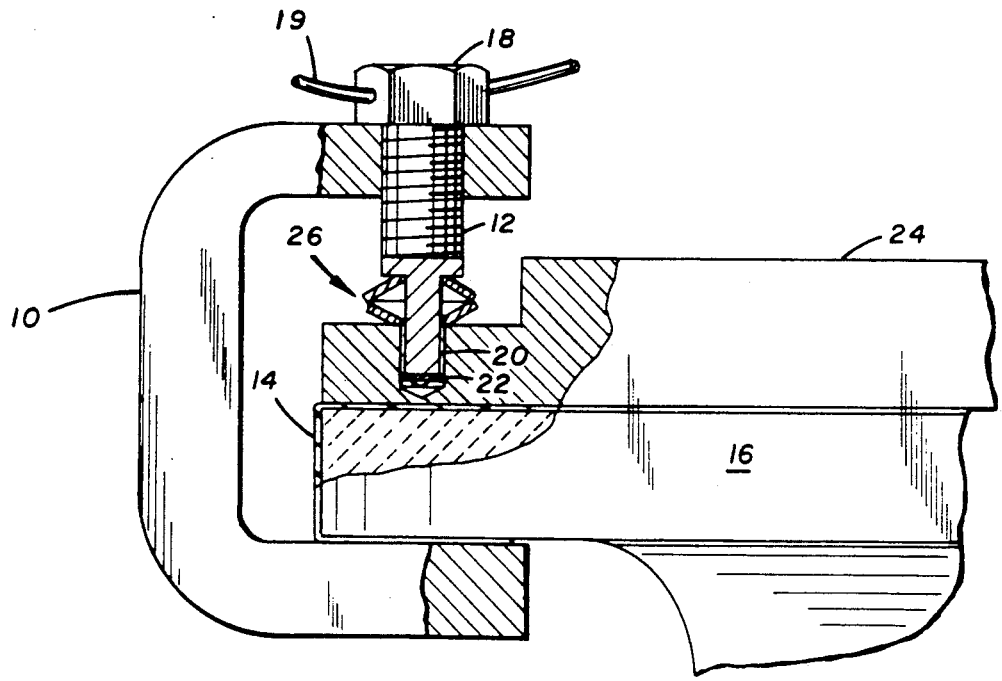
FIG. 1 illustrates a side, partly sectional view of a typical embodiment of the invention.

An illustrative embodiment of the invention is shown in FIG. 1 of the drawing. In this embodiment a C clamp 10 made of metal or another substance with similar rigidity and strength has a threaded hole in one leg through which a force providing screw 12 is threadably engaged. The glass 16 of the telescope, radar or other device being assembled will rest against the other leg of the C clamp with a thin, resilient material 14 inserted therebetween as a cushion.

Figure 4:
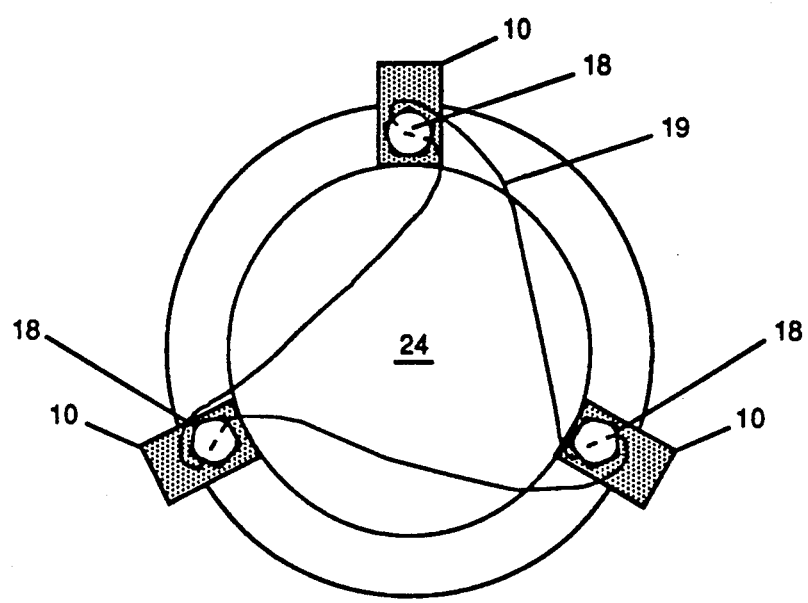
FIG. 4 is a top view of the support backing and three clamps of the invention in use with the force providing screws of the clamps being secured by a lockwire.

The force providing screw 12 has a screw head 18 on one end and a spindle 20 on the other end. The screw head 18 permits the force providing screw 12 to be tightened until the screw head 18 is flush with the leg of the C clamp 10. The screw head 18 is maintained in this position with the assistance of a continuous loop of lockwire 19 which is inserted through the screw head 18 in a plurality of C clamps 10 (FIG. 4) being used. The lockwire 19 is then tightened and tied off. In such a configuration, the lockwire 19 prevents each force providing screw 12 of a plurality of force providing screws 12 (FIG. 4) from turning and becoming loose which is particularly important in a high vibrational environment As the force providing screw 12 is tightened, the spindle 20 slides in a channel 22 in the metal support structure 24 with the channel 22 being sufficiently long that the spindle 20 will not bottom out even when the screw head 18 is flush against the leg of the C clamp 10.

Mounted on the spindle are one or more resilient energy storing devices, in this case Belleville washers 26. The Belleville washers are in the shape of the frustum of a cone and may be stacked in series as is shown in FIG. 1 or in parallel, i.e., inserted inside each other as cones are normally stacked for storage. By stacking in series the deflection for a given load is increased in proportion to the number of washers while stacking in parallel increases the load capacity in proportion to the number of washers. Of course, springs, such as coil springs or the like, may be used in place of the washers.

If desired, the Belleville washers may be paired up and the force provided by each pair measured. Then, to ensure each pair of washers provides equal force, the edge of each washer in the pair which is in contact with the other washer can be filed down. Filing the edges of the washers reduces the force exerted by that pair and, thus, the force exerted by each pair of washers can be equalized.

Figure 2:
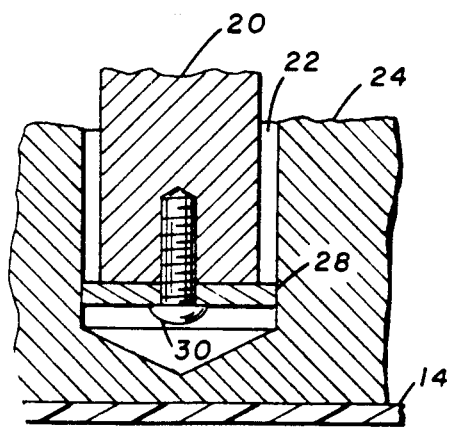
FIG. 2 is a side, sectional view of the spindle in the channel of the metal support structure.

An additional refinement of the invention is shown in FIG. 2. A flat washer 28 is attached to the end of the spindle 20 by means of a screw 30 or the like. The diameter of the flat washer 28 extends to the sides of the channel 22 and is slightly greater than the diameter of the spindle 20. The purpose of the flat washer is to prevent the Belleville washers 26 or other energy storage devices from dropping off the spindle 20 when it is not inserted in the channel 22.

Figure 3:
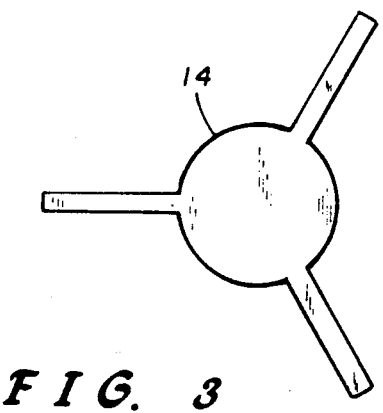
FIG. 3 is a top view of a piece of thin, resilient material which is inserted between the glass and its metal support structure.

As alluded to above, a thin, resilient material 14 (FIG. 3), for example, a 0.010 inch thick piece of plastic, nylon or the like, is placed between the glass 16 and the metal support structure 24 as shown in FIG. 1. In the preferred embodiment, tabs of the material 14 (FIG. 3) extend outwardly from the glass-support structure interface and are wrapped around the edge of the glass 16 to cushion the interface between glass 16 and the leg of the C clamp (FIG. 1). Alternatively, the tabs could be eliminated and a separate piece of resilient material (not shown) could be affixed to the leg of the C clamp.

In operation, the C clamp 10 is placed on the glass-metal structure with the tab of the resilient material 14 wrapped around the edge of the glass and inserted between the glass and the leg of the C clamp. The force providing screw 12 with the spindle 20 sliding in the channel 22 is tightened until the screw head 18 is flush against the leg of the C clamp 10. The energy storage devices, in this case two Belleville washers 26, are compressed by the spindle base against the back of the metal support structure 24 which is thereby forced against the resilient material and the glass which in turn is forced against the resilient material 14 on the other leg of the C clamp.

The combination of the screw head 18 and the longer length of the channel 22 in relation to the spindle 20 limits the amount of force that can be placed on the glass-metal structure to that exerted by the compressed Belleville washers 26. The Belleville washers 26 or other energy storage devices, if used, ensure a controlled amount of force is exerted which is sufficient to keep the glass-metal structure together without cracking or breaking the glass. The size of the glass-metal structure will determine how many devices of the invention will be utilized.

The invention as thus described provides a simple, relatively inexpensive, effective device and method for attaching glass to metal. Assembly time and, hence, expenses for any glass-metal structure will be reduced as will the likelihood that the glass will be cracked or broken during the assembly process. The assembled device will not be affected by temperature extremes, vibration or a vacuum. The invention will be useful in the mounting of both small and large glass or ceramic mirrors, optical lenses and the like.

What we claim is:

1. A device for attaching glass to a support backing comprising:
   a support backing for supporting said glass;
   a clamp having two legs for extending about said glass and said support backing;
   a force providing screw threaded through a hole in one leg of said clamp;
   a screw head on the proximal end of said force providing screw, said screw head having a diameter larger than the diameter of said hole in said leg of said clamp;
   a spindle extending from the distal end of said force providing screw, said spindle diameter being less than said force providing screw diameter;
   a channel in said support backing for receiving said spindle; and
   an energy storage device mounted on said spindle between said force providing screw and said support backing for forcing said glass and said support backing together against the other leg of said clamp when said force providing screw is tightened;
   wherein said channel is sufficiently long that said spindle will not bottom out in said channel when said force providing screw is tightened such that said screw head is flush against said leg of said clamp.

2. A device as recited in claim 1, wherein said energy storage device is a spring.

3. A device as recited in claim 2, wherein said spring is a coil spring.

4. A device for attaching glass to a support backing comprising:
   a support backing for supporting said glass;
   a clamp having two legs for extending about said glass and said support backing;
   a force providing screw threaded through a hole in one leg of said clamp;
   a screw head on the proximal end of said force providing screw, said screw head having a diameter larger than the diameter of said hole in said leg of said clamp;
   a spindle extending from the distal end of said force providing screw, said spindle diameter being less than said force providing screw diameter;
   a channel in said support backing for receiving said spindle; and
   a Belleville washer mounted on said spindle between said force providing screw and said support backing for forcing said glass and said support backing together against the other leg of said clamp when said force providing screw is tightened;
   wherein said channel is sufficiently long that said spindle will not bottom out in said channel when said force providing screw is tightened such that said screw head is flush against said leg of said clamp.

5. A device as recited in claim 4, wherein a plurality of Belleville washers are stacked in series on said spindle.

6. A device as recited in claim 5, wherein said clamp is a C clamp.

7. A device as recited in claim 5, wherein the force exerted by a pair of said Belleville washers is equalized with the force exerted by every other of said pairs by filing an edge of each of said Belleville washers in said pair, said edges being filed in said pair being said edges in contact with each other.

8. A device as recited in claim 4, further comprising a thin, resilient material, said material being placed between said glass and said support backing and between said glass and said other leg of said clamp.

9. A device as recited in claim 4, further comprising a lockwire, said lockwire being inserted through said screw head in a plurality of clamps being used and then the ends of said lockwire being joined, tightened and tied off, said lockwire thereby preventing a plurality of force providing screws from turning and coming loose.

10. A device as recited in claim 4, further comprising a flat washer attached to the distal end of said spindle to prevent said Belleville washer from dropping off said spindle when said spindle is not inserted in said channel.

11. A method for attaching glass to a support backing comprising the steps of:
prov018ing a support backing for supporting said glass;
providing a clamp having two legs for extending about said glass and said support backing;
threading a force providing screw through a hole in one leg of said clamp;
providing a screw head on the proximal end of said force providing screw, said screw head having a diameter larger than the diameter of said hole in said leg of said clamp;
extending a spindle from the distal end of said force providing screw, said spindle diameter being less than said force providing screw diameter;
providing a channel in said support backing for receiving said spindle; and
mounting an energy storage device mounted on said spindle between said force providing screw and said support backing for forcing said glass and said support backing together against the other leg of said clamp when said force providing screw is tightened;
wherein said channel is sufficiently long that said spindle will not bottom out in said channel when said force providing screw is tightened such that said screw head is flush against said leg of said clamp.

12. The method as recited in claim 11, wherein said energy storage device is a spring.

13. The method as recited in claim 12, wherein said spring is a coil spring.

14. A method for attaching glass to a support backing comprising the steps of:
providing a support backing for supporting said glass;
providing a clamp having two legs for extending about said glass and said support backing;
threading a force providing screw through a hole in one leg of said clamp;
providing a screw head on the proximal end of said force providing screw, said screw head having a diameter larger than the diameter of said hole in said leg of said clamp;
extending a spindle from the distal end of said force providing screw, said spindle diameter being less than said force providing screw diameter;
providing a channel in said support backing for receiving said spindle; and
mounting on said spindle between said force providing screw and said support backing for forcing said glass and said support backing together against the other leg of said clamp when said force providing screw is tightened;
wherein said channel is sufficiently long that said spindle will not bottom out in said channel when said force providing screw is tightened such that said screw head is flush against said leg of said clamp.

15. The method as recited in claim 14, further comprising the steps of:
stacking a plurality of Belleville washers in series on said spindle.

16. The method as recited in claim 13, wherein the force exerted by a pair of said Belleville washers is equalized with the force exerted by every other of said pairs by filing an edge of each of said Belleville washers in said pair, said edges being filed in said pair being said edges in contact with each other.

17. The method as recited in claim 16, wherein said claim is a C clamp.

18. The method as recited in claim 14, further comprising the step of placing a thin, resilient material between said glass and said support backing and between said glass and said other leg of said clamp.

19. The method as recited in claim 14, further comprising the step of inserting a lockwire through said screw head in a plurality of clamps being used and then joining, tightening and tying off the ends of said lockwire, said lockwire thereby preventing a plurality of force providing screws from turning and coming loose.

20. The method as recited in claim 14, further comprising the step of attaching a flat washer to the distal end of said spindle to prevent said Belleville washer from dropping off said spindle when said spindle is not inserted in said channel.

* * * * *

UNITED STATES PATENT AND TRADEMARK OFFICE
CERTIFICATE OF CORRECTION

PATENT NO. : 5,052,793

DATED : October 1, 1991

INVENTOR(S) : Roger H. Lapp and Robert R. Gardner

It is certified that error appears in the above—identified patent and that said Letters Patent is hereby corrected as shown below:

Column 5, line 39, delete "mounted".

Column 6, line 17, after "mounting" insert -- a Belleville washer --.

Column 6, line 30, delete "13", and substitute therefor -- 15 --.

Signed and Sealed this

Eighteenth Day of August, 1992

Attest:

DOUGLAS B. COMER

Attesting Officer

Acting Commissioner of Patents and Trademarks